Figure 2:
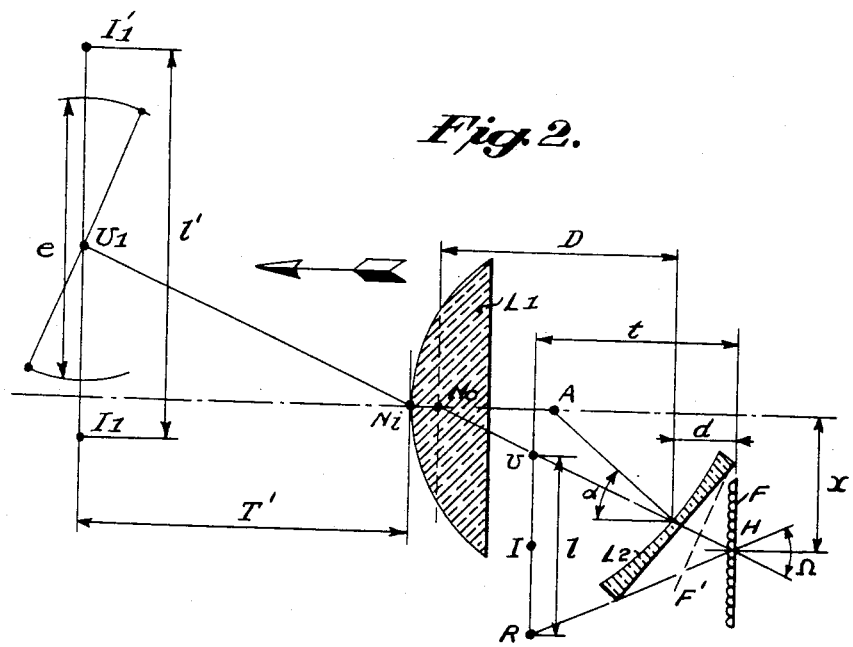

Feb. 17, 1959     A. H. J. DE LASSUS ST-GENIÈS     2,873,643
                  DEVICES FOR VIEWING WITH MAGNIFICATION
                  RELIEF IMAGES ON LENTICULATED FILMS
Filed March 23, 1954                            2 Sheets-Sheet 1
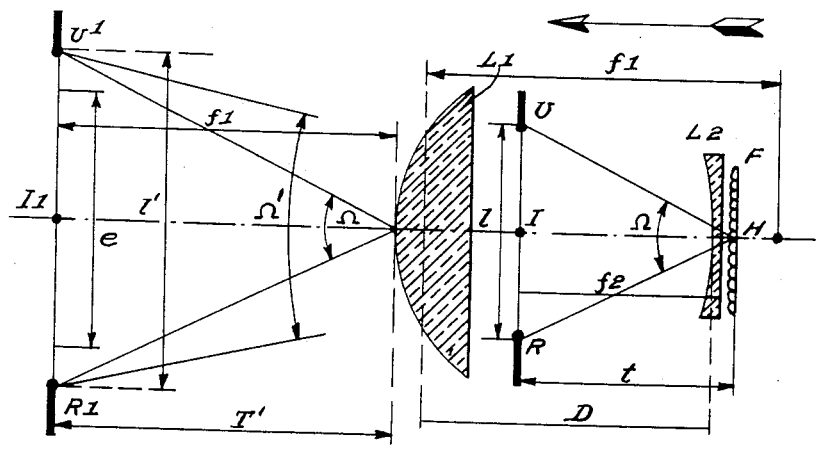
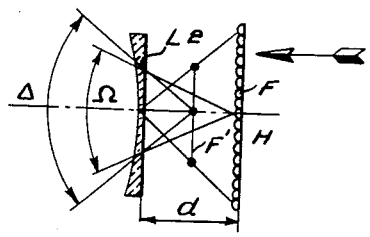 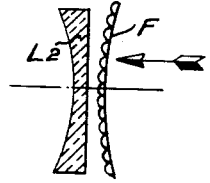
INVENTOR.
Anne Henri Jacques de Lassus St. Geniès
BY
Stone + Mack
ATTORNEYS.

INVENTOR.
Anne Henri Jacques de Lassus St. Geniès
BY
Stone + Mack
ATTORNEYS.

United States Patent Office 2,873,643
Patented Feb. 17, 1959

2,873,643

DEVICES FOR VIEWING WITH MAGNIFICATION RELIEF IMAGES ON LENTICULATED FILMS

Anne Henri Jacques de Lassus St-Geniès, Paris, France

Application March 23, 1954, Serial No. 418,206

Claims priority, application France March 25, 1953

2 Claims. (Cl. 88—1)

The present invention relates to viewing in binocular vision, with the aid of apparatus effecting a considerable magnification, relief images obtained on lenticulated films or copies of said relief images, more particularly in the case of small sizes.

Hereinafter, the term "lenticulated film" will designate any support, one side of which is coated with an emulsion, the other side being lenticulated or covered with a thin transparent lenticulated sheet.

It is known that a lenticulated film, exposed in a photographic still camera or in a motion picture camera, records with discontinuity and without mutual overlapping microscopic elementary images having as width the lenticulation interval on conditon that the effective aperture ratio of this objective be, only slightly less or at most, equal to the aperture of the cylindrical lenticules.

It is also known that, after development of the latent image, the film which is illuminated on its gelatine side, reconstructs in space the exit pupil of the objective, as it was seen from the film when recorded in a stationary camera at a distance as present in the camera.

This aerial pupil is commonly called "pupil of the lenticulated film" or its "natural pupil."

According to whether the exit pupil of the objective appeared in the camera in front of or behind the film, the "pupil" of the film is reconstructed on the side of the lenticulated support or on the other side.

It is hereinafter understood that this "pupil" is constructed on the side of the lenticulated support and that the recorded elementary images on the emulsion, in each microscopic chamber, are as wide as the lenticulation interval.

It is further known that an observer, on displacement in this "pupil," may in monocular vision see and isolate on the film images which seem to cover it completely without interruption, and which are continuous successive aspects of the subject.

Finally, it is known that when viewing the film in diffused light, successive "lateral pupils" may be delimited on both sides of this "central pupil." The same succession of points of view may be found in a satisfactory way, in these lateral pupils, in as much as the row of these pupils is not too high,.this row decreasing as the aperture of the cylindrical lenticules is larger. By providing two distinct view points for the eyes within these pupils, the relief is perceived.

The present invention relates to a method for observing small sizes of film with the aid of magnifiers, and essentially consists in using two lens combinations, one convergent, called $L_1$, the other generally divergent, called $L_2$, placed at a certain distance from each other. The combination $L_2$ mounted near the lenticular side of the film mainly serves to set back to a predetermined distance, in front of or behind the film, the plane containing the "pupils" of the film. The convergent combination $L_1$ mounted at a certain adjustable distance with respect to the combination $L_2$ for ensuring the best accommodation has for its object to effect the magnification of the relief image and to construct in the viewing zone of the observer real images of the film "pupils" near which, and with a rather large latitude, the observer is placed for viewing in binocular vision the relief image.

The invention is illustrated in the accompanying drawing.

Fig. 1 repersents a sectional view of a magnifier along a plane containing the principal coinciding axes of the two lens combinations $L_1$ and $L_2$, this plane being perpendicular to the lines of the cylindrical lenticulation of the film, both combinations being diagrammatically reduced to simple lenses and the lens combination $L_2$ being very near the lenticulated side of the film.

A detail, Fig. 1a, represents the film cylindrically bent, with the convexity orientated to the system $L_1$, $L_2$.

Another detail, Fig. 1b, supposes a certain space, adjustable between $L_2$ and the film.

Fig. 2 represents a sectional view of a magnifier along a plane containing the axes of the two lens combinations $L_1$ and $L_2$ but wherein these axes intersect at a limited distance in this plane, the lens combination $L_2$ being necessarily disposed in this arrangement at a certain distance to the film and oblique to its plane.

Figure 3:
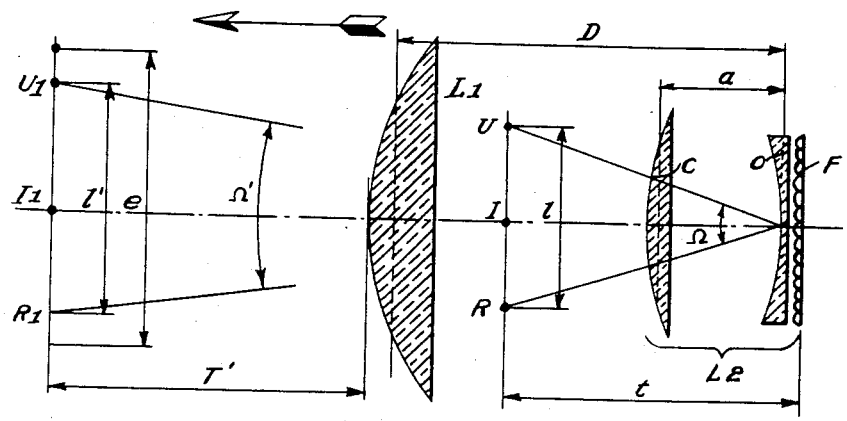

Fig. 3 represents a sectional view of a magnifier in which both lens combinations $L_1$ and $L_2$ are centered, but which differs from the above in that the combination $L_2$ is composed of two lenses, or lens systems, one generally divergent, O, fixed and quite near the film, the other being convergent, C, co-axial, but retractable from the divergent lens O between O and the lens combination $L_1$.

Considering Fig. 1, the lens combination $L_2$, a simple concave lens f. i., is placed in contact with the film, and is without particular influence on the value of the angle $\Omega$ (aperture of the elementary chambers) which it transmits to the combination $L_1$. $L_2$ is also without particular influence on the size of the image of the film proposed to the observer through lens $L_1$.

$L_2$ gives to the film pupils a first image which is located at a distance $t'$ (not given) of $L_2$ on the same side as the pupils relatively to the film, or on the other side according to whether the focal distance $f_2$ of this lens is larger or smaller than the distance $t$, called "natural distance" wherein the film forms its pupils.

$$t' = \frac{tf_2}{t - f_2}$$

The convergent lens $L_1$, of focal length $f_1$, gives a second image of the pupils of the film which must always be real, by taking over the image furnished by $L_2$. The relations to establish between $t$, $f_2$, $f_1$, must be such that the second image of the film pupils is located in the zone of the observer at a distance of the lens $L_1$ which permits the observer to use satisfactorily this lens in binocular vision.

A concrete example: F is a film in contact with $L_2$ by its lenticulation. If $t'$ is the conjugated distance of $t$ in respect of $L_2$, if D is the distance which separates the whole $L_2F$ from the lens $L_1$, and finally, if, in respect of $L_1$, one designates by $T = (-t' + D)$ the non-represented distance, separating the lens $L_1$ from the image given by $L_2$ of the plane of the film pupils, the distance $T'$ at which the lens $L_1$ constructs the second and final image of these pupils is obtained by the relation:

$$T' = f_1 \frac{f_2 t - D(t - f_2)}{f_2 t + (f_1 - D)(t - f_2)} \quad (1)$$

Likewise, if the width of the central natural film pupil is designated by $l$, and $\Omega$ is the aperture of the elementary lenticular chambers $$l = 2t \cdot \text{tg } \Omega/2 \quad (2)$$

The width of the first image of this pupil, given by $L_2$, is with $l$ in the relation $t'/t$, and the width of the second is to that of the first image in the relation of $T'/T$, so that the width $l'$ of this final image is with $l$ in the relation $t'T'/tF$
wherefrom $$l' = 1\frac{t'T'}{tT} = 2\frac{t'T'}{T} \text{ tg } \Omega/2 \qquad (3)$$

and making $$l' = \frac{f_2 t}{t - f_2} \qquad l' = \frac{2f_1 f_2 t}{(t-f_2)(D-f_1) - f_2 t} \text{ tg } \Omega/2$$

In a concrete case, represented on the Fig. 1, where the first image on the film pupil is projected to infinity ($f_2 = t$)

$$t' = \infty = T$$

wherefrom $T' = f_1$ by the Relation 1 and $l' = 2f_1$ tg $\Omega/2$ by the Relation 3. The angle $\Omega$ is known. The width $l'$ must be a bit larger or smaller than the mean distance of the eyes ($e = 63$ mm.) for creating the most pronounced relief. The factor $f_1$ is immediately deduced from the particular value of $l'$, and therefrom the distance D, smaller than or equal to $f_1$, such that the magnified image of the film is located at a distance of easy accommodation (between 30 cm. and infinity). The observer adjusts at will this value of D.

Another example is tg $\Omega/2 = \frac{1}{6}$, which corresponds to a pitch $f/3$ for the camera objective.

The expression of the particular value of $l'$, about equal to $e$, is then written: $l' = f_1/3 \geq e$ wherefrom $f > < 3 \times 63 =$ 190 mm., $f_1$ must be a bit more or less than 190 mm., for obtaining the satisfactory value of $l'$.

Indeed, if the film has recorded the reversed relief and if $l'$ be larger than $e$, the observer placed within the central film pupil can only perceive by binocular vision the reversed relief, unless the view points of the eyes may be inverted by a device. This is obtained by a value of $l'$ smaller than $e$, since in this case the right eye of the observer occupies a view point at the extreme left side of the image of the right lateral pupil of the row No. 1, and that the left eye, vice versa, occupies a view point at the extreme right side of the image of the left lateral pupil of the same row No. 1.

If a film is viewed which shows the same natural pupil, but having recorded the correct relief, the eyes of the observer must be within a same pupil image of the film for viewing the correct image.

One or the other result is obtained, i. e. $l'$ about equal to $e$, larger or smaller than $e$, in a first solution, when the focal length of $L_2$ equals $f_2 = t$, and with two distinct lenses $L_1$, one for which $f$ is larger than 190 mm., in proportion to the desired excess of $l'$ on $e$, the other for which $f$ is in similar way smaller than 190 mm.

The particular case disclosed here, $f_2 = t$, is not the most interesting. First of all, the exchange of $L_1$ concerns the most important optical part of the apparatus. Then, when $l'$ is about equal to $e$, the magnification obtained with a focal length of about 200 mm., is not considerable. Finally, in order to prevent this weak point, the use of a lens $L_1$ of rather short focal length, capable of stronger magnification, would compel the observer to place his eyes near the exterior edges of the images of the two lateral pupils, for instance of row No. 1 or higher, in the case of films having recorded the correct relief (whereas it would be outside and near the interior edges of these pupil images, for the case of reversed relief images). But apart from the fact that when $l'$ is rather small, considerable deviations of the value of $e$ from one observer to the other may exert a considerable influence on the relief effect, for correct use of lens $L_1$ of rather short focal length in binocular vision, the observer must stand far enough therefrom. In the disclosed case, he must stand far from the focal plane of $L_1$ containing the images of the film pupils, otherwise the interference of the elementary exit rays, which occurs beyond these images, produces on the film a division of the photograph, in the form of zones separated by parallels to the lines of the lenticulation, the relief being alternatively correct and reversed.

For eliminating this defect, when $f'$ is rather small, the final images of the film pupils must be displaced at a distance from $L_1$, f. i. three or four times the value of $f_1$, in such a way that also their width $l'$ is about that of the mean pupillar space $e$. The solution $f_2 = t$ is thus to be rejected.

The final image of the film pupils may only be displaced far enough by fixing a value of $T = D - t'$, not only finite, but also positive relatively to $L_1$. This would not generally be obtained by giving $t'$ a positive value relatively to $L_2$ and smaller in absolute value than D, but practically by giving $t'$ a negative value relatively to $L_2$, such that T totals the two absolute values of D and of $t'$. This result is not only to be expected from a focal length $f_2$ smaller in absolute value than the natural distance $t$, but also, and in case this value be rather weak, by cylindrically bending the film around an axis perpendicular to the plane of the Fig. (detail 1a). This bending results in a distortion of the viewed image, which may be avoided f. i. by calculating the curvatures of the lenses $L_2$ and $L_1$.

However, if the particular solution $f_2 = t$ compels to exchange the combination $L_1$ when the nature of the recorded relief changes, a formula which eliminates this drawback may be proposed, without departing from this solution. The consideration of the apparatus of Fig. 1 and of the relations (1) and (3) suggests that two focal distances $f_2$ of $L_2$, each not very different from $t$, must give, at two distances $T'$ not very different from each other, two values of $l'$ which are respectively the one slightly less, the other slightly higher than $e$, so that, by simply exchanging the lens $L_2$ (which may be a spectacle glass) one can, with the aid of the same apparatus, pass from the viewing of the films showing the reversed relief to that of films showing the correct relief, on condition that these two kinds of films show the same natural pupils at the same distance.

The detail shown on Fig. 1b supposes that a given space $d$ has been provided between the film F and the lens $L_2$. This disposition modifies the magnifications and, at the same time, the effective aperture of the elementary rays transmitted, which passes from the angle $\Omega$ to $\Delta$. The size of $e$ is generally of small importance relatively to $f_2$ and to $t$, and, therefore, the introduction of this space $d$ is without considerable influence upon the distance $T'$. But its action on $\Omega$ may have a considerable influence on the value of $l'$.

Consequently, spaces $d$ permit to pass with the same lens $L_2$ from viewing one to another kind of film and allow any observer to have the best adaptation of $l'$ to his interocular distance.

Considering Fig. 2, it will hereinafter be supposed as heretofore that the natural pupil distance $t$ is measured in front of the lenticulated support of the film, i. e., it is negative relatively to the combination $L_2$.

The apparatus is intended as the former for viewing the two kinds of films, but it is more particularly conceived for the satisfactory viewing of films, having recorded the reversed relief, the axes of the combinations $L_1$ and $L_2$ intersecting at a point A f. i. in the plane of the figure.

Still supposing $f_2 = t$ or almost equal to $t$, and $x$ the decentering of the film relatively to $L_1$ and $d$ the spacing parallel to the axis of $L_1$, between the middle H of the film and the centre of the lens $L_2$. These characteristics are thus that the line HU passing along one of the edges of the central film pupil crosses the lens $L_2$ at its nodal points (practically confused) and passes along the nodal points of the lens $L_1$ for rejoining at the exit of $L_1$ the point $U_1$ final image of U given by the two combinations $L_1$ and $L_2$.

In this arrangement of $L_1$ and $L_2$, the observer may place his eyes on either side of this point $U_1$ between the points $L_1$ and $L_2$, at a distance of $l'$, these points being the centres of the final images of the central pupil and of one of the first lateral pupils. It is assumed that $l' > e$ which is the condition of the perception of the reversed relief recorded by the film in the case where the observer be within one of these pupils. However, he perceives here the correct relief, since there is on either side of the point U inversion of the view points of his eyes, his right eye occupying a view point in the left half of the central pupil and his left eye a view point in the right half of the image of the first lateral pupil on the left side.

The drawing of propagation of the luminous beams at the exit of $L_1$ would show that the perceived relief is the more accentuated as the observer retires farther from the apparatus.

However, an important distortion of the image borne by the film would be caused by this decentering $x$, if, in the absence of any corrective means, the lens $L_2$ has also been decentered, the axis having been maintained parallel to that of $L_1$. It is for this reason that the axes of these two lenses have to intersect at A.

Indeed, this distortion is very sufficiently corrected, if the lens $L_2$ is turned at an angle $\alpha$ around an axis perpendicular to the plane of the figure and passing through the centre of the lens, so that the virtual image $F'$ furnished by $L_2$ be viewed through $L_1$ by the observer as if it was constructed in a plane perpendicular to its line of sight $U_1H$.

The same apparatus may be used for the viewing of films having recorded the correct relief and showing the same pupils at the same distance $t$ as the films having recorded the reversed relief. It suffices to provide for the sliding motion of the frame bearing the film in its plane until it meets the axis of the lens $L_1$, and to center the film and the lens $L_2$ on the lens $L_1$, the lens $L_2$ being kept parallel to F at the same distance $d$ of F.

Indeed, the width of the final images of the film pupils preserves its value $l' > e$ in the same plane, and the observer may stand in the central pupil, as in Fig. 1, for perceiving this correct relief.

A variation of the value of $d$ may ensure to the observer the best adaptation of the value of $l'$ to his $e$ for giving him the most accentuated relief.

Considering Fig. 3, which shows an apparatus in which the combinations $L_1$ and $L_2$ are centered and which besides an adjustment of the spacing D between $L_1$ and the film F near $L_2$ comprises an arrangement of the combination $L_2$ essentially composed of two lenses, one, O, in contact with the film, generally divergent, the other, C, convergent, between which an adjustable spacing $a$ may be established.

The function of lens $L_1$ is still to furnish the magnification of the image. The new function of the combination $L_2$ is obtained by the spacing $a$ of the two lenses O and C composing it, with the purpose of passing from the viewing of films, showing one kind of relief to that of the films showing the other kind. By giving $a$ the highest value, the lowest value of $l'$ is obtained, i. e., that which, $a$ slightly smaller than $e$, permits the viewing of films having recorded the reversed relief, whereas the lowest value of $a$ (f. i. zero), gives the highest value of $l'$, that which, $a$ slightly higher than $e$, permits the viewing of films having recorded the correct relief.

Proposing a concrete example, it is supposed that $f_1 = 190$ mm., $tg\ \Omega/2 = 1/6$, $D = 100$ mm. and $t = 150$ mm. If $l'$ is to be maximum and approximately equal to 72 mm. in proximity of the focal plane of $L_1$ and a minimum and practically null, a negative value of $f_0$, focal length of O, ($-100$ mm. f. i.) must be matched with a positive value of $f_c$ focal length of C, about four times greater in absolute value for complying with the first condition, and in order that an extension of $\pm$ 50 mm. of $a$ gives the lowest value of $l'$ (approaching 54 mm.) in a plane very near the image focal plane of $L_1$.

If the upper value of $l'$ is attained for a value of $a$, other than null, it is on the one hand possible to obtain by the reduction of a value of $l'$ which, although exceeding 72 mm., may still satisfy the large pupillar spaces $e$, whereas, on the other hand, the extension of $a$ may be raised above 50 mm. for satisfying the pupillar spaces smaller than 54 mm., and still show the most accentuated relief.

It is the same result as proposed above, by intervention on $d$, for the sole lens $L_2$, Fig. 1b. Yet, a slight modification of $a$ suffices here to satisfy the extreme cases, for this action is accompanied with a direct effect in opposite direction on $l'$, and with a variation of $\Omega$ which is added in the same direction to the effect in $l'$. The apparatus according to Fig. 1b could give the opposite effect.

By comparison with the solution described in Fig. 1b, it may be stated that the intervention on $a$, due to the weak convergence of C brought near that of O, exerts a minor influence on the magnification of the apparatus of Fig. 3, and much weaker anyway than the intervention on $d$ in the case of Fig. 1b.

The angle $\Omega$ is as in Fig. 1, that under which the elementary beams at the exit of $L_1$ seem to the observer to emanate from the image of the film.

The case of films bearing their pupils on the gelatinized side i. e. of films of which the axes of the elementary beams go divergently at the exit of the lenticulated support should now be considered. These films correspond to recording conditions such that the exit pupil of the objective was formed behind the film in the camera.

It may be seen that the combination $L_2$, always placed at the lenticular side, is not necessarily divergent any more. At the side where the film pupils are located, it must indeed form a first image of these pupils, the distance of which should be comprised between infinity and the object focus of the lens $L_1$ according to the position desired farther from or nearer to the focal point of $L_1$ to the plane containing the final images of the film pupils and according to the size of $l'$ of these images.

Viewing of the two kinds of films may be effected in the same apparatus without modifying the adjustments of the optical combinations of the apparatus (Figs. 1 or 3) in the case of copied films.

Indeed, a method for optically copying lenticulated films is known, permitting for any value of the enlargement to obtain the recording of an effective aperture of the elementary beams on the copy film which may at will be larger or smaller than the effective aperture of the elementary beams emanating from the original.

The application of this method gives in the plane where the final images of the film pupils are formed, two values of $l$ and consequently two values of $l'$ obtained by the expression (3), for one adjustment of the apparatus, according to whether one or the other kind of film is viewed i. e. according to the value $\Omega$ for each of them. It suffices that the highest value of $\Omega$ be that of the films showing the correct relief when the lowest value is that of the films showing the reversed relief—i. e. a widening of the effective aperture of the elementary beams to the desired extent, whilst copying the original films, suffices for making that the two kinds of films may be used in a simple manner in the viewing apparatus described above.

The original films viewed at the lenticular side of the support always show a reversal of the right and of the left side of the photographed subject. For rectifying the image, it suffices to introduce a reflection on the path of the luminous beams f. i. between the film F and the combination $L_1$. In this case, the apparatus can no longer serve to view original films and film copies. Providing a mirror for the original films, behind the combination $L_1$, operating the correction of the images shown by the original films, permits the use of one only apparatus for viewing the two kinds of films.

I claim:

1. Portable optical system for direct viewing in correct relief with magnification, lenticulated films of small size which have recorded reversed or correct relief, comprising two optical lens systems $L_1$ and $L_2$, the said optical lens system $L_1$ having a diameter at least as great as the interpupillary distance of the observer's eyes and being capable of magnifying about three times the image borne by the film oriented towards the $L_1$ lens system by its lenticulated face, and placed at a definite distance from the film less than its focal distance $f_1$, this said optical lens system $L_1$ forming a virtual magnified image in correct relief for the observer placed at the other side of the film at a definite distance $T'$ of about 30 to 50 cm. from this optical lens system $L_1$ and viewing in binocular vision, said optical lens system $L_2$ being placed in close relationship to the lenticulated surface of the film and being a negative lens and so designed and computed that it places an image of the film pupil (pupil which is the aerial image of the exit pupil of the taking objective and lies in a plane at the distance $t$ in front of the film) in a plane which lies at a distance from the lens system $L_1$ which is conjugate with the distance $T'$ as defined hereinbefore in the system, whereby the film may be viewed in proper relief.

2. Portable optical system for direct viewing in correct relief with magnification, lenticulated films of small size which have recorded reversed or correct relief, comprising two optical lens systems $L_1$ and $L_2$, the said optical lens system $L_1$ having a diameter at least as great as the interpupillary distance of the observer's eyes and being capable of magnifying about three times the image borne by the film oriented towards the $L_1$ lens system by its lenticulated face, and placed at a definite distance from the film less than its focal distance $f_1$, this said optical lens system $L_1$ forming a virtual magnified image in correct relief for the observer placed at the other side of the film at a definite distance $T'$ of about 30 to 50 cm. from this optical lens system $L_1$ and viewing in binocular vision, said optical lens system $L_2$ being placed in close relationship to the lenticulated surface of the film and being a positive lens and so designed and computed that it places an image of the film pupil (pupil which is the aerial image of the exit pupil of the taking objective and lies in a plane at the distance $t$ behind the film) in a plane which lies at a distance from the lens system $L_1$ which is conjugate with the distance $T'$ as defined hereinbefore in the system, whereby the film may be viewed in proper relief.

References Cited in the file of this patent

UNITED STATES PATENTS

| | | |
|---|---|---|
| 1,283,815 | Lamphier | Nov. 5, 1918 |
| 1,749,278 | Frederick | Mar. 4, 1930 |
| 1,808,725 | DeFrancisco | June 2, 1931 |
| 1,931,228 | Kitroser | Oct. 17, 1933 |
| 2,351,032 | Gabor | June 13, 1944 |
| 2,652,499 | Argabrite | Sept. 15, 1953 |

FOREIGN PATENTS

| | | |
|---|---|---|
| 14,716 | Great Britain | June 25, 1913 |
| 989,739 | France | May 30, 1951 |
| 1,046,676 | France | July 15, 1953 |